United States Patent
Grosch et al.

(10) Patent No.: US 9,524,259 B2
(45) Date of Patent: Dec. 20, 2016

(54) METHOD FOR OPERATING AN AUTOMATION DEVICE TO REDUCE DEAD TIME ON ACCOUNT OF A PHYSICAL INTERRUPTION IN A RING OR A FAILED UNIT

(71) Applicant: Siemens Aktiengesellschaft, Munich (DE)

(72) Inventors: Thomas Grosch, Rosstal (DE); Jürgen Laforsch, Buehl (DE); Albert Renschler, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 30 days.

(21) Appl. No.: 14/553,675

(22) Filed: Nov. 25, 2014

(65) Prior Publication Data

US 2015/0154130 A1 Jun. 4, 2015

(30) Foreign Application Priority Data

Dec. 3, 2013 (EP) ..................... 13195546

(51) Int. Cl.
*G06F 3/00* (2006.01)
*G06F 5/00* (2006.01)
*G06F 13/24* (2006.01)
*G05B 9/03* (2006.01)
*G05B 19/042* (2006.01)
*H04L 12/437* (2006.01)

(52) U.S. Cl.
CPC ............... *G06F 13/24* (2013.01); *G05B 9/03* (2013.01); *G05B 19/0428* (2013.01); *H04L 12/437* (2013.01); *G05B 2219/24175* (2013.01); *G05B 2219/24182* (2013.01); *G05B 2219/24187* (2013.01); *G05B 2219/25165* (2013.01)

(58) Field of Classification Search
None
See application file for complete search history.

(56) References Cited

U.S. PATENT DOCUMENTS

| 7,944,818 B2 * | 5/2011 | Barthel | ............. G05B 19/0428 370/228 |
| 2002/0196735 A1 * | 12/2002 | Hayes | ................ H04L 12/4641 370/216 |
| 2004/0223503 A1 * | 11/2004 | Lynch | .................. H04L 12/437 370/404 |

(Continued)

FOREIGN PATENT DOCUMENTS

| DE | 4242438 A1 | 6/1994 |
| EP | 2034668 A1 | 3/2009 |
| EP | 2224642 A1 | 9/2010 |

*Primary Examiner* — David E Martinez
(74) *Attorney, Agent, or Firm* — Cozen O'Connor

(57) ABSTRACT

A method for operating an automation device having a CPU module that is configured to effect read or write access to local peripherals that are each provided with two interface modules that are each wired up in ring form to an input/output controller, wherein peripheral access operations are executed via one of the rings or via both rings, and wherein a redundancy manager that is provided for each ring is used to logically interrupt the respective ring in a normal mode and to initiate ring reconfiguration for this ring in the event of a physical ring interruption so as to provide a basis for allowing peripheral access operations during the actual period of this ring reconfiguration.

7 Claims, 3 Drawing Sheets

(56) References Cited

U.S. PATENT DOCUMENTS

| | | | |
|---|---|---|---|
| 2005/0010843 A1* | 1/2005 | Iwamitsu | G06F 11/0727 714/724 |
| 2007/0047472 A1* | 3/2007 | Florit | H04L 12/437 370/256 |
| 2007/0053298 A1* | 3/2007 | Ke | H04L 12/5601 370/236.2 |
| 2009/0059947 A1* | 3/2009 | Barthel | G05B 19/0428 370/437 |
| 2011/0249551 A1* | 10/2011 | Rollins | H04L 12/437 370/222 |

* cited by examiner

METHOD FOR OPERATING AN AUTOMATION DEVICE TO REDUCE DEAD TIME ON ACCOUNT OF A PHYSICAL INTERRUPTION IN A RING OR A FAILED UNIT

BACKGROUND OF THE INVENTION

1. Field of the Invention

The invention relates to an automation device and method for operating the automation device, which includes a CPU module that is configured to effect read or write access to local peripherals that are each provided with two interface modules that are each wired up in ring form to an input/output controller, where peripheral access operations are executed via one of the rings or via both rings, and where a redundancy manager that is provided for each ring is used to logically interrupt the respective ring in a normal mode and to initiate ring reconfiguration for this ring in the event of a physical ring interruption.

2. Description of the Related Art

Methods and automation devices are known in the field of automation engineering, and to increase the availability of the communication link between the input/output controllers (I/O controllers) of an automation unit and the local peripheral units (local peripheral, I/O devices), the link is of redundant design, and a media redundancy protocol (MRP) is also provided. In normal mode, the respective redundancy manager or respective MRP manager logically interrupts the respective ring, where the redundancy manager is able to form part of the respective input/output controller and has two interfaces (two ports) for data transmission. The logical ring interruption prevents the information transmitted from the CPU module of the automation unit to the peripheral units, e.g., messages, packets or data, from looping in the respective ring, such as on account of an erroneous peripheral address. This means that the respective ring wiring logically represents a linear structure based on the respective ring interruption.

It may now arise that between two peripheral units, for example, one of the ring wiring elements is physically interrupted or one of the peripheral units has failed, and therefore the redundancy manager is no longer able to receive the test information supplied to the ring via one port at its other port. In this case, the redundancy manager initiates reconfiguration of the communication path by indicating the changed topology or the changed linear structure to the peripheral units. The redundancy manager then uses both interfaces or uses both ports to transmit the information, which means that the information is transmitted in opposite directions. During what is known as a dead time, which represents the period of this ring reconfiguration or the period of the "training" with respect to the new linear structure, the CPU module is unable to effect read or write access to the peripheral units, which has a disruptive effect on the control of a technical process that needs to be controlled.

SUMMARY OF THE INVENTION

It is therefore an object of the invention to provide an automation device and a method that is used to reduce the dead time on account of a physical interruption in the ring wiring or on account of a unit that has failed.

This and other objects and advantages are achieved in accordance with the invention by providing an automation device and method in which the automation device particularly has a large volume of project data, i.e., a large number of peripheral units, in which one or more ring reconfigurations so that long dead times can usually be expected, where the CPU module is able to effect read or write access to the peripheral units during this actual ring reconfiguration.

In one exemplary embodiment of the invention, a user prescribes, in the course of project planning for the local peripherals, whether in the event of the physical ring interruption the peripheral access operations are executed via the other ring. By way of example, the user prescribes that peripheral access operations are meant to be effected by the other ring only for "time-critical" peripherals.

In a further embodiment of the invention, a high-availability automation device is implemented. Here, the device has two automation units that each have a CPU module and two input/output controllers, these input/output controllers each being wired up in ring form to one of the interface modules of the local peripherals. One of these automation units is the leader in respect of the peripheral access operations, which means that process initial values or write access operations are accomplished only by one of the two automation units. Only in the event of one automation unit failing does the other automation unit undertake control of the technical process and execute the peripheral access operations.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and the refinements and advantages thereof are explained in more detail below with reference to the drawing, which illustrates an exemplary embodiment of the invention and in which.

DETAILED DESCRIPTION OF THE EXEMPLARY EMBODIMENTS

Figure 1:
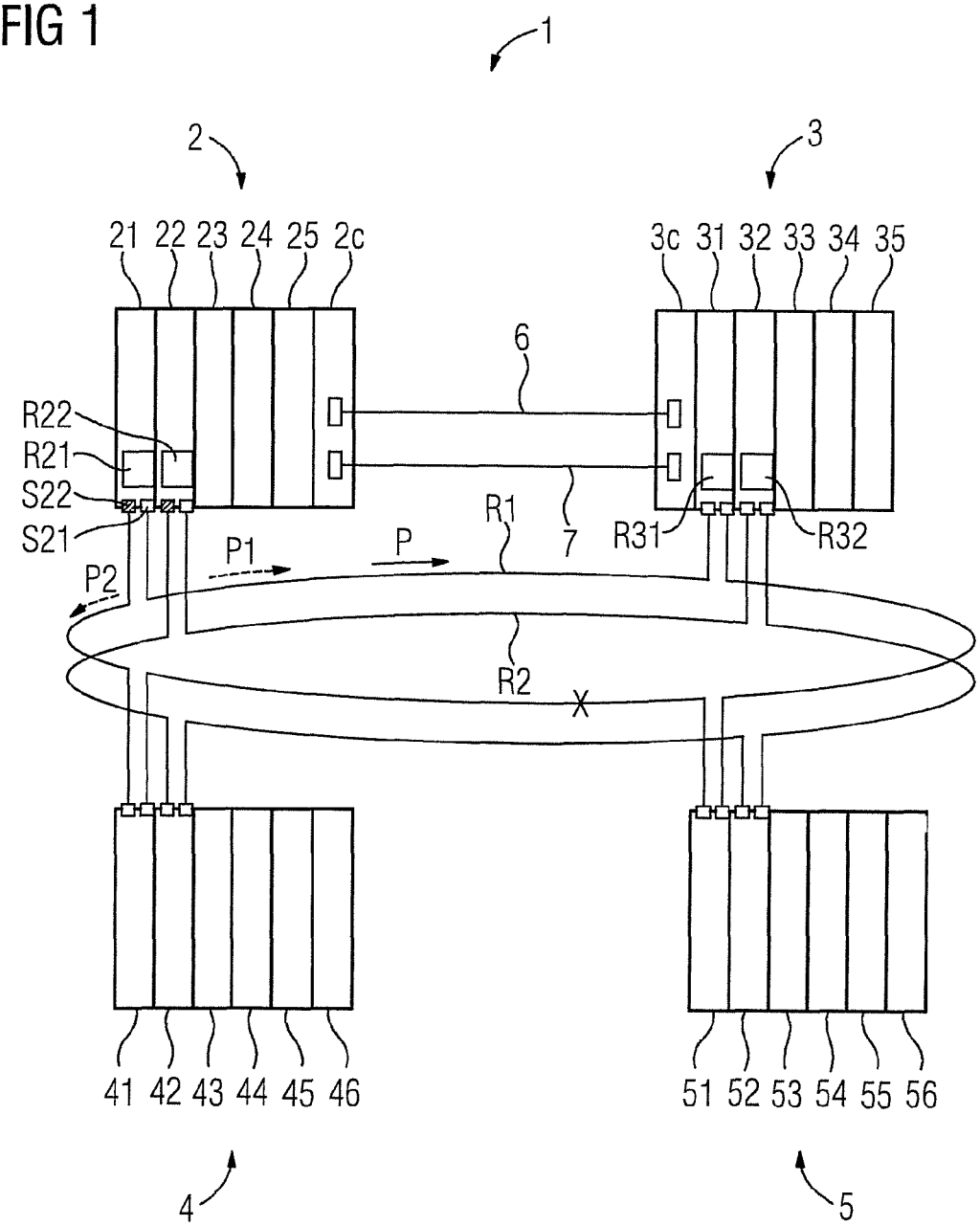
FIG. 1 shows an automation device.
Figure 2:
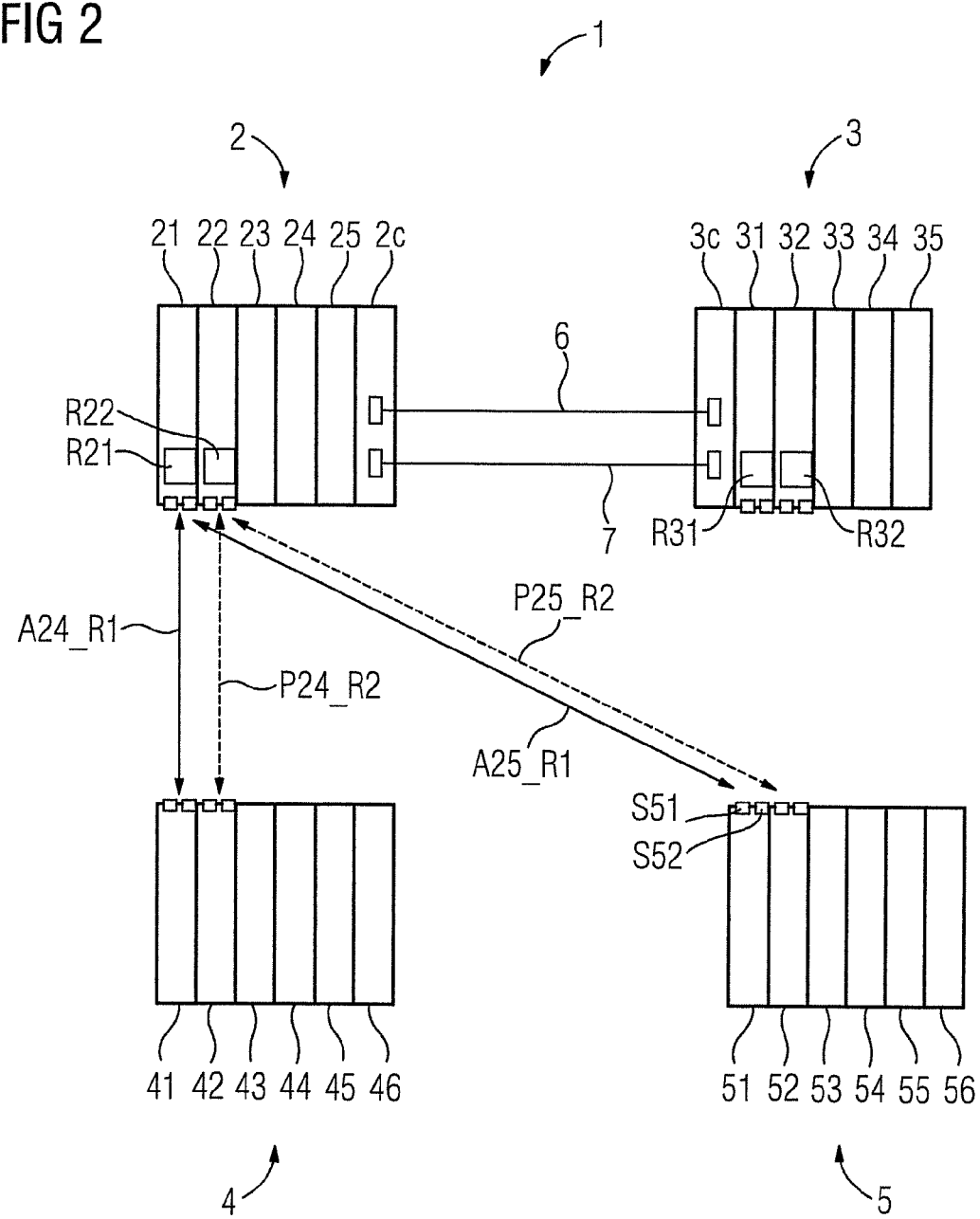
FIG. 2 shows a logical connection structure.

The elements that are the same in FIGS. 1 and 2 are provided with the same reference symbols.

FIG. 1 shows parts of a high-availability automation device 1 in simplified form. This automation device 1 is provided for the purpose of controlling a technical process or a technical installation and has a first and a second automation unit 2, 3 and also two local peripherals or peripheral units 4, 5 that are wired up in ring form to the automation units 2, 3. The automation units 2, 3 are each provided with a CPU module 2c, 3c and two input/output controllers or master modules 21, 22, 31, 32 that are each wired up in ring form via rings R1, R2 to a respective one of two interface modules 41, 42 of the peripheral 4 and one of two interface modules 51, 52 of the peripheral 5. The wiring in ring form is accomplished via appropriate interfaces (ports) of the input/output controllers 21, 22, 31, 32 and the interface modules 41, 42, 51, 52, this involving each of these input/output controllers 21, 22, 31, 32 and each of these interface modules 41, 42, 51, 52 having two interfaces for connection either to the ring R1 or to the ring R2. Consequently, a respective interface is provided for an incoming connection and a respective interface is provided for an outgoing connection of the ring R1 or of the ring R2. In the present example, the two interfaces of the input/output controller 21 are denoted by S21, S22 for purposes of clarity, with information being transmitted from the interface S21 to the interface S22 clockwise, for example, which is indicated via an arrow P in the drawing. These interface modules 41, 42, 51, 52 can be used by the CPU modules 2, 3 to effect read or write access to further modules 43, 44, 45, 46, 53, 54, 55, 56 of the local peripherals 4, 5, such as further modules in the form of analog and/or digital input/output modules.

It should be understood that the automation units 2, 3 have further modules, e.g., modules 23, 24, 25, 33, 34, 35, which may be in the form of analog and/or digital input/output modules, in the form of communication modules or in the form of further modules that are suitable for the operation of the respective automation unit 2, 3. Furthermore, it should be understood that the respective CPU module 2c, 3c may be configured to undertake the tasks of the two input/output controllers or master modules 21, 22, 31, 32, which entails a higher burden for these CPU modules 2c, 3c, however.

It is subsequently assumed that the automation unit 2 is operated as a master automation unit and is therefore the leader with respect to the control of the technical process (process control). By contrast, the automation unit 3 operates as a reserve automation unit, with both automation units 2, 3 processing the same control program for the process control, but access to the peripherals 4, 5 being affected only by the master automation unit 2. The automation unit 3 effects read or write access to the peripherals 4, 5 only if the automation unit 2 has failed, which is indicated to the automation unit 3 via synchronization lines 6, 7. Here, the automation unit 3 undertakes mastership for the process control.

For each of the rings R1, R2 of the automation device 1, at least one redundancy manager is provided. In the present exemplary embodiment, the automation device 1 has redundancy managers R21, R22, R31, R32, which are part of the respective input/output controller 21, 22, 31, 32 of the master automation unit and the reserve automation unit 2, 3. The redundancy manager R21 of the master automation unit 2 logically interrupts the ring R1 and the redundancy manager R22 logically interrupts the ring R2, which is illustrated in the drawing via shaded squares. Based on these logical interruptions in the rings R1, R2, two linear structures are provided in a logical terms. The redundancy managers R31, R32 of the reserve automation unit 3 logically short the rings R1, R2, which means that the information to be transmitted via the rings R1, R2 can be forwarded. These redundancy managers R31, R32 logically interrupt the rings R1, R2 only if the automation unit 3 has undertaken mastership following failure of the automation unit 2.

It is subsequently assumed that the CPU module 2c of the automation unit 2 accesses the peripherals 4, 5 via the input/output controller 21, the ring R1 and the interface modules 41, 51. As a result, only the information or data transmitted via the ring R1 are regarded as valid. The fact that the data transmitted via the ring R1 are rated as valid is indicated by the input/output controller 21 to these interface modules 41, 51 via an identifier provided for this purpose in the data or data stream transmitted via the ring R1. By contrast, the data transmitted by the ring R2 are rated as invalid, which the input/output controller 22 indicates to these interface modules 42, 52 likewise via an identifier provided for this purpose in the data transmitted via this ring R2. In addition, the redundancy manager R21 uses the interface S21 of the input/output controller 21 and uses the ring R1, for example, at prescribed intervals of time to transmit test data that the redundancy manager R21 uses to check the continuity of the ring R1.

In the event of the interface S22 of the input/output controller 21 receiving these test data, this indicates that the connection is still active, which means that the ring R1 is physically uninterrupted. In the same way, the redundancy manager R22 checks the continuity of the ring R2, where it is subsequently assumed that the ring R2 is uninterrupted.

In the event of ring R1 being physically interrupted, on the other hand, e.g., on account of wire breakage at a point denoted by X in the drawing, the test data are not received at the interface S22, which indicates a physical ring interruption. Here, the redundancy manager R21 of the automation unit 2 initiates ring reconfiguration, with the redundancy manager R21, the input/output controller 21 or the CPU module 2c immediately activating the input/output controller 22. Based on this activation, the subsequent peripheral access operations are effected via the input/output controller 22, the ring R2 and the interface modules 42, 52, i.e. the data transmitted via the ring R2 are regarded as valid for further processing. The fact that these data that are now transmitted by the ring R2 are valid is again indicated by the input/output controller 22 to the interface modules 42, 52 via an identifier provided for this purpose in the data or data stream transmitted by the ring R2. By contrast, the data transmitted by the ring R1 are rated as invalid, which the input/output controller 21 indicates to the interface modules 41, 51 likewise via an identifier provided for this purpose in the data transmitted by this ring R1. Based on the peripheral access made possible in this manner via the ring R2 during or before termination of the reconfiguration of the ring R1, the dead time is shortened.

During the peripheral access operations that are to be executed by the ring R2, the redundancy manager R21 reconfigures the ring R1 which, as explained, means that the redundancy manager R21 "trains" the automation unit 3 and the peripheral units 4, 5 for the new linear structure in a conventional manner. This indicates to these units 3, 4, 5 that for the ring R1 the access operations occur in opposite directions, which is indicated by dashed arrows P1, P2 in the drawing.

Whether, following the ring reconfiguration of the ring R1, the data transmitted via the new linear structure in the directions P1 and P2 (new connection via linear structure "active") or the data transmitted via the ring R2 (connection via ring 2 "active") can be rated as valid is again indicated to the units 3, 4, 5 via an appropriate identifier in the data stream to be transmitted, in the manner described.

FIG. 2 shows the logical structure of the connections from the automation device shown in FIG. 1. As described, the CPU module 2c of the master automation unit 2 is used to effect the access operations on the peripherals 4, 5 via the ring R1 if this ring R1 is uninterrupted. The access operations are effected via active connections A24_R1, A25_R1 between the input/output controller 21 and the interface module 41 of the peripheral 4, on the one hand, and the interface module 51 of the peripheral 5, on the other hand. In the event of the ring R1 being interrupted, the active connections A24_R1, A25_R1 are deactivated and passive connections P24_R2, P25_R2 between the input/output controller 22 and the interface module 42 of the peripheral 4, on the one hand, and the interface module 52 of the peripheral 5, on the other hand, are activated. In other words, active connections are changed over to passive connections and passive connections are changed over to active connections, which allows the CPU module 2c to access the peripherals 4, 5 via the ring R2. In the present exemplary embodiment, only two local peripherals 4, 5 are shown. it should be readily understood, however, that the automation device 1 may have a large number of local peripherals, one half of which are connected to the ring R1 and the other half of which are connected to the ring R2, for example. If the ring R2 fails, for example, then only half of all the peripherals need to be changed over to the ring R1, and the access operations on all the peripherals can be effected by the ring R1. In addition, a user can prescribe, in the course of project planning, which of the peripherals need to be changed over in the first place in the event of a ring interruption. By way of example, the user prescribes that peripheral access operations via the ring R1 need to be effected only for "time-critical" peripherals.

Figure 3:
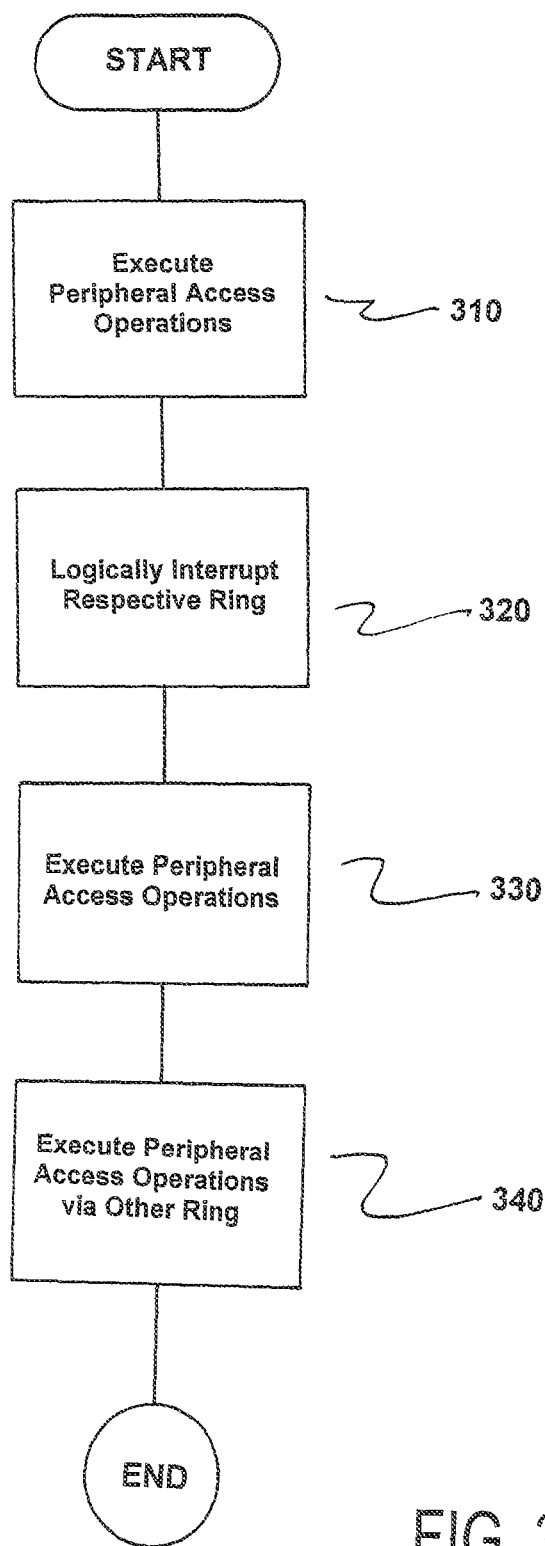
FIG. 3 is a flowchart of the method in accordance with the invention.

FIG. 3 is a flowchart of a method for operating an automation device including a CPU module (2c; 3c) that is configured to effect read or write access to local peripherals (4, 5) that are each provided with two interface modules (41, 42, 51, 52) and are wired up in ring form to an input/output controller (21, 22; 31, 32). The method comprises executing peripheral access operations via one of (i) an individual ring of two rings (R1, R2) and (ii) both rings (R1, R2) of the two rings, as indicated in step 310.

The method further comprises logically interrupting, by a redundancy manager provided for each individual ring (R1, R2) of the two rings, a respective ring (R1, R2) in a normal mode and initiating ring reconfiguration for the respective ring (R1, R2) in an event of a physical ring interruption, as indicated in 320.

The peripheral access operations are now executed for at least one of the local peripherals (4, 5) via another ring (R2) of the two individual rings, as indicated in step 330.

Next, the peripheral access operations for at least one of the local peripherals (4, 5) are executed via the other (R2) of the two individual rings in an event of the ring reconfiguration being initiated for one of the rings (R1), as indicated in step 340.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an automation device including a CPU module which is configured to effect read or write access to local peripherals that are each provided with two interface modules and wired up in ring form to an input/output controller the method comprising:
    executing peripheral access operations via one of (i) an individual ring of two rings and (ii) both rings of the two rings;
    logically interrupting, by a redundancy manager provided for each individual ring of the two rings, a respective ring in a normal mode and initiating ring reconfiguration for the respective ring in an event of a physical ring interruption;
    executing the peripheral access operations for at least one of the local peripherals via another ring of the two individual rings; and
    executing via the other of the two individual rings the peripheral access operations for at least one of the local peripherals in an event of the ring reconfiguration being initiated for one of the rings.

2. The method as claimed in claim 1, wherein project planning for the local peripherals comprises prescribing whether in the event of the physical ring interruption the peripheral access operations are executed via the other ring.

3. The method as claimed in claim 1, wherein the CPU module and the two input/output controllers are configured as part of a first automation unit,
    wherein a further CPU module and two further input/output controllers are configured as part of a second automation unit; and
    wherein a respective one of the further input/output controllers of the second automation unit is wired up in ring form to a respective one of the interface modules of the local peripherals and to a respective one of the input/output controllers of the first automation unit.

4. An automation device comprising:
    local peripherals each provided with two interface modules;
    a CPU module configured to effect read or write access to the local peripherals;
    at least two input/output controllers each wired up in ring form to one module of the two interface modules of the local peripherals, the CPU module executing peripheral access operations via one of (i) two individual rings and (ii) both individual rings;
    a redundancy manager for each ring, which logically interrupts a respective ring of the two individual rings in a normal mode, the redundancy manager being configured to lift the logical interruption in an event of a physical ring interruption and to initiate ring reconfiguration for the respective ring of the two individual rings;
    wherein the automation device is configured to:
    execute the peripheral access operations for at least one of the local peripherals via another ring of the two individual rings in the event of the ring reconfiguration requiring initiation for one of the two rings.

5. The automation device as claimed in claim 4, wherein project planning comprises a user prescribing for the local peripherals whether in an event of the physical ring interruption the peripheral access operations are executed via the other ring.

6. The automation device as claimed in claim 4, wherein the CPU module and the two input/output controllers form part of a first automation unit;
    wherein the automation device includes a second automation unit provided with a CPU module and with two input/output controllers; and
    wherein a respective one of the further input/output controllers of the second automation unit is wired up in ring form to a respective one of the interface modules of the local peripherals and to a respective one of the input/output controllers of the first automation unit.

7. The automation device as claimed in claim 5, wherein the CPU module and the two input/output controllers form part of a first automation unit;

wherein the automation device includes a second automation unit provided with a CPU module and with two input/output controllers; and wherein a respective one of the further input/output controllers of the second automation unit is wired up in ring form to a respective one of the interface modules of the local peripherals and to a respective one of the input/output controllers of the first automation unit.

* * * * *